United States Patent [19]

Aubry

[11] Patent Number: 5,383,767
[45] Date of Patent: Jan. 24, 1995

[54] BLADE-HUB LINKAGE DEVICE WITH A LAMINATE ATTACHMENT

[75] Inventor: Jacques A. Aubry, Cabries, France

[73] Assignee: Eurocopter France, France

[21] Appl. No.: 165,863

[22] Filed: Dec. 14, 1993

[30] Foreign Application Priority Data

Dec. 23, 1992 [FR] France ............... 92 15609

[51] Int. Cl.$^6$ ............................. B64C 27/48
[52] U.S. Cl. ................... 416/134 A; 416/203; 416/226; 416/230
[58] Field of Search ............. 416/134 A, 135, 138, 416/203, 226, 229 R, 230

[56] References Cited

U.S. PATENT DOCUMENTS

| | | |
|---|---|---|
| 2,999,668 | 9/1961 | Howald et al. |
| 3,161,238 | 12/1964 | Key .......................... 416/226 |
| 3,594,097 | 7/1971 | Mouille . |
| 4,281,966 | 8/1981 | Duret et al. ............... 416/134 A |
| 4,292,009 | 9/1981 | Weiland et al. ........... 416/134 A |
| 4,345,876 | 8/1982 | Schwarz et al. .......... 416/134 A |
| 4,386,989 | 6/1983 | Aubry . |
| 4,616,977 | 10/1986 | Schramm ................. 416/134 A |
| 4,626,172 | 12/1986 | Mouille et al. . |
| 4,626,173 | 12/1986 | Mouille et al. . |
| 4,639,284 | 1/1987 | Mouille et al. . |
| 5,066,195 | 11/1991 | Dobrzynski . |
| 5,306,119 | 4/1994 | Bandoh et al. ............ 416/203 |

FOREIGN PATENT DOCUMENTS

| | | |
|---|---|---|
| 0033275 | 8/1981 | European Pat. Off. . |
| 0212724 | 3/1987 | European Pat. Off. . |
| 1593008 | 5/1970 | France . |
| 2622170 | 4/1989 | France . |

Primary Examiner—Edward K. Look
Assistant Examiner—James A. Larson
Attorney, Agent, or Firm—Larson and Taylor

[57] ABSTRACT

A device for linking a blade to the hub comprising a laminate attachment at the end of the rooting part with torsion bars of the blade, the laminate attachment being in abutment against the pins for holding on the hub. The opposite blades of the rotor may be arranged angularly offset with respect to the other blades.

18 Claims, 7 Drawing Sheets

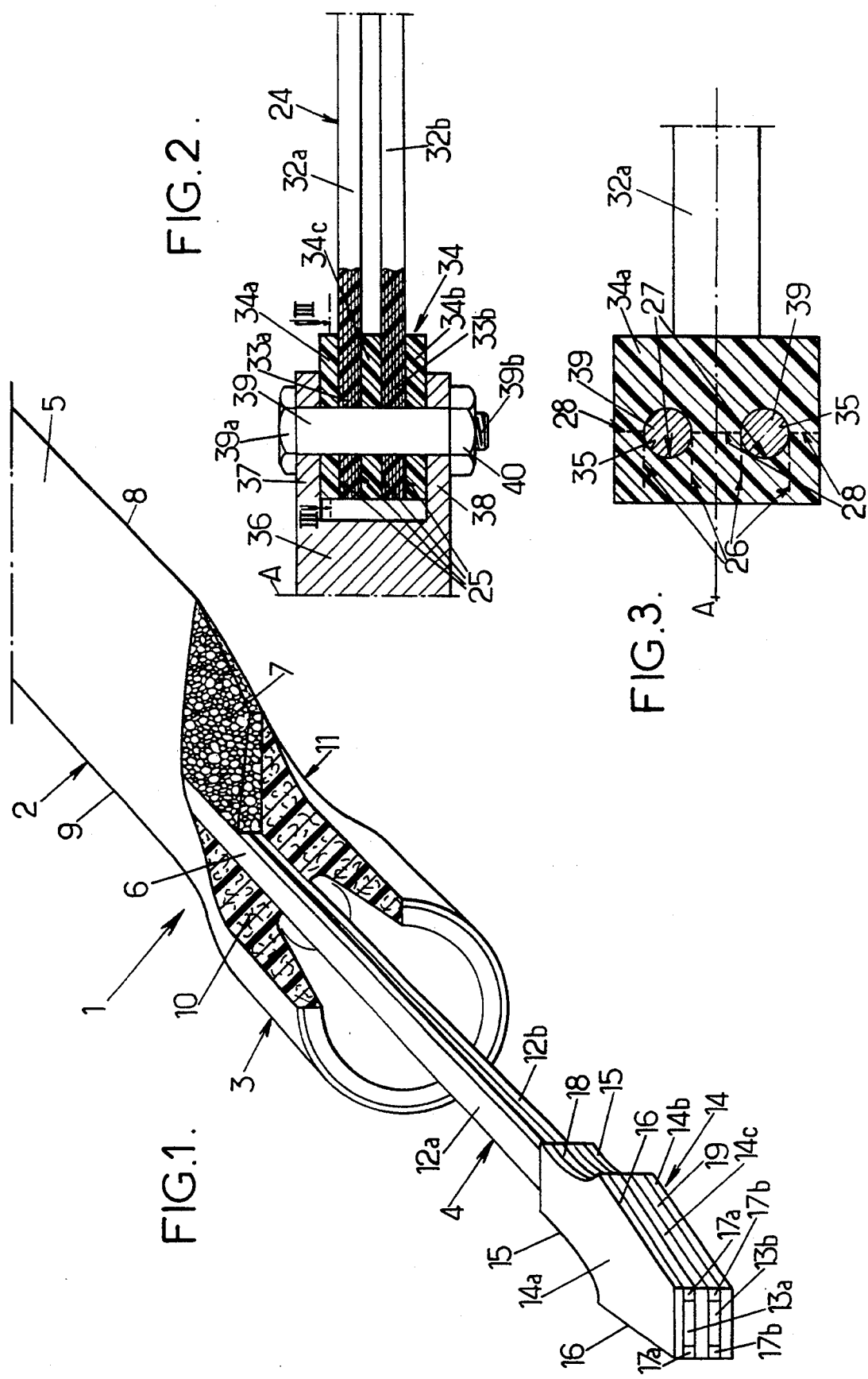

FIG.4
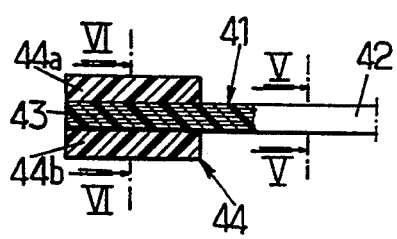
FIG.6
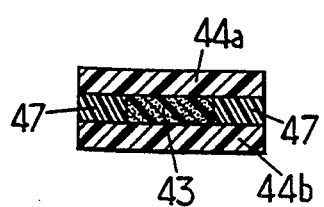
FIG.5
FIG.7
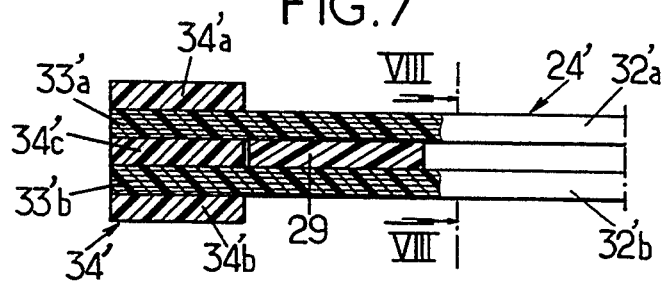
FIG.8
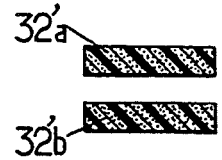
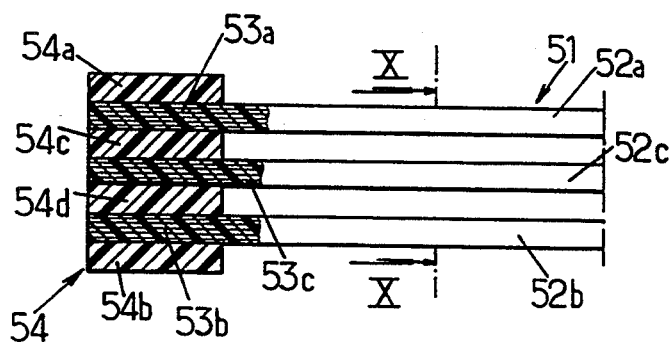
FIG.9
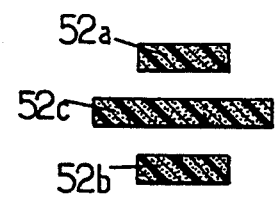
FIG.10

BLADE-HUB LINKAGE DEVICE WITH A LAMINATE ATTACHMENT

BACKGROUND OF THE INVENTION

FIELD OF THE INVENTION

The invention relates to a blade-hub linkage device with laminate attachment, intended to fasten a rotor blade, preferably fitted from the outset with such an attachment, to a hub of a variable-pitch multiblade rotor, which can be used, preferably as a tail rotor, in particular a ducted tail rotor, for an aircraft such as a helicopter.

The invention also relates to a variable-pitch multiblade ducted tail rotor for a helicopter, as well as to a blade provided with a laminate attachment, and particularly intended for equipping a rotor according to the invention.

The blade according to the invention, of the type held to the hub by the inner radial end (with respect to the axis of the hub) of at least one twistable and preferably also flexible blade attachment composite bundle or torsion bar, and known by Patents U.S. Pat. Nos. 4,626,172 and 4,892,462, comprises a rigid shell with aerodynamic profile, extended on the side intended to point toward the hub by a tubular blade root, a strengthened framework, which is at least partially housed substantially longitudinally in the shell, and a rooting part of the blade, comprising at least one bar for attachment of the blade, which is elongated substantially in the longitudinal extension of the shell, said bar being twistable about its longitudinal axis, made from composite material and comprising substantially unidirectional fibers which are agglomerated by a rigidified synthetic resin, said bar being linked to the said framework and extending at least partially outside the shell, passing through the blade root.

The torsion property of the elongate composite bar allows control of the pitch of the blade by twisting the bar about its longitudinal axis, and its property of being preferably also flexible allows angular oscillations of flapping and in drag of the blade.

DESCRIPTION OF THE INVENTION

In the two aforementioned patents, the rooting part of the blade consists of the inner radial end part which leaves the shell, passing through the blade root, of a single bar of rovings which is folded on itself in substantially two halves which are parallel and side-by-side or slightly spaced apart, which form the largest part, fixed in the shell, of a spar, in the form of an elongate strip, whose longitudinal axis is substantially parallel to that of the blade.

This rooting part is thus arranged in a loop, which allows individual attachment of each blade to the hub of the rotor, by surrounding a single metal attachment spool bolted onto the hub.

For this purpose, the thickness of the rooting part, measured along the axis of the spool, increases progressively from the part of the bar fixed in the shell toward the free end of the loop surrounding the metal spool, while its width, measured substantially from the leading edge to the trailing edge of the blade, decreases progressively in a corresponding manner, the cross section of the bar keeping a substantially constant area.

The methods of manufacture of blades according to the aforementioned patents are time-consuming and difficult to employ, and therefore lead to blades which are expensive to manufacture. In fact, the structure of the looped rooting part of these blades makes it necessary to impart, by bending, a curvature of small radius to the fibers constituting the bar, with risks of breakage of the fibers during this operation of winding the rovings. Furthermore, since this radius of curvature varies as a function of the position of each fiber in the thickness of the bar, the radius being smaller as the fiber is closer to the center, it is difficult, when manufacturing the winding, to give each fiber a uniform tension so that all the fibers participate in a substantially equivalent manner in the transmission in the attachment of the traction load onto the whole of the bar. Finally, since there is practically no latitude for altering the cross section of the bar of rovings in the looped rooting part, there is no possibility of optimizing the geometry of the cross section of the bar independently of the metal attachment spool in order to find better stress and torsional stiffness distributions in the bar.

The basic problem of the invention is to overcome these drawbacks, which are linked with the loop configuration of the rooting part of the blade, and to provide a blade-hub linkage device and blades of the aforementioned type which have higher performance and are more economical than those which are the subject of the aforementioned patents.

One object of the invention is to provide a blade-hub linkage device which is at least partially made of composite material and a blade with a rooting part comprising at least one composite torsion bar, in which the structures allow optimized use of the material, and of the volume, as well as not to interrupt or disturb the arrangement of the unidirectional fibers of the torsion bar of the rooting part of the blade, at the linkage device attaching the blade to the hub.

In particular, one object of the invention is to provide a blade-hub linkage device and a blade of the aforementioned type which ensure improvement of the fatigue strength of the blade and more specifically its means for linking and holding it to the hub, while making it possible to optimize the geometry of the cross section of the composite torsion bar of the rooting part, as regards the distribution of stress and the torsional stiffness, and to do this independently of the particular means for holding the blade to the hub.

A further object of the invention is to provide a blade-hub linkage device and a blade of the aforementioned type, in which the structures allow their manufacturing price to be decreased.

SUMMARY OF THE INVENTION

For this purpose, the subject of the invention is a blade-hub linkage device, intended to fix to a rotor hub at least one blade of the aforementioned type, the device comprising, for at least one torsion bar of the rooting part, a laminate attachment including at least two laminate elements between which an end portion for linking said bar to the hub is sandwiched and fixed, said end portion being situated on the side opposite the shell and substantially flattened, each laminate element comprising a stack of at least two layers of fibers which are agglomerated by a rigidified synthetic resin, at least one of the resins of the bar and of the laminate attachment solidly joining said laminate elements to said end portion, the solid combination of said laminate attachment and the end portion of said bar being in abutment, toward the shell, against means for holding the laminate attachment and the blade to the hub.

Such a linkage device has the advantage that the linkage by laminate attachment between the torsion bar of the blade and the means for holding the laminate attachment and the blade to the hub allow forces, in particular centrifugal forces, coming from the blade and stressing the bar, to be transmitted to this hub at two levels: on the one hand, the axial forces stressing the bar are transferred in the layers of fibers of the laminate elements of the attachment by shearing of the linkage between said bar and said layers of fibers, and, on the other hand, the forces stressing said layers of fibers are transferred in said means for holding the laminate attachment of the blade to the hub by shearing, tension and compression in these layers of fibers which are agglomerated by a resin.

It is thus possible to make optimized use of the volume available for linking a blade to the hub by optimized use of the composite materials producing the laminate attachment, without disturbing or interrupting the unidirectional fibers of the torsion bar at the part of this bar which is solidly attached to the laminate attachment.

It is thus possible also to optimize the geometry of the section of the torsion bar in order to obtain the desired stress distribution and torsional stiffness, so as to improve the fatigue strength of the blade and of its linkage to the hub, without complicating the production of the laminate attachment, the shape and dimensions of which, in particular the cross section of the laminate elements, are chosen as a function of the nature of the means for holding to the hub, in order to allow good force transmission to the latter.

As mentioned hereinabove, a further subject of the invention is a blade for a rotor, especially a multiblade rotor, in particular one with variable pitch, which can be used as a tail rotor, preferably a ducted tail rotor, for an aircraft, in particular a helicopter, the blade being of the type defined hereinabove and being such that at least one torsion bar of the rooting part of the blade has, on the side opposite the shell, an end portion for linking the bar to a rotor hub which is a substantially flattened portion, sandwiched and fixed between two laminate elements of a laminate attachment of a blade-hub linkage device according to the invention and as defined hereinabove.

A final subject of the invention is a multiblade rotor, in particular with variable pitch, which can be used as a tail rotor, especially a ducted tail rotor for a rotorcraft, especially a helicopter, and the invention provides such a rotor in which the general architecture is similar to that of the rotor described in Patent U.S. Pat. No. 4,626,172, whose volume and drive mode can be retained, in order for it to be possible for the multiblade rotor according to the invention to be substituted for that described in the aforementioned patent.

For this purpose, the multiblade rotor according to the invention, as described in U.S. Pat. No. 4,626,172 and comprising:
 a drive shaft, intended to be driven in rotation about an axis of rotation of the rotor,
 a hub linked in rotation with the drive shaft,
 a plurality of blades, each of which is joined to the hub by a rooting part with at least one composite, elongate torsion bar, is such that each blade is a blade with laminate attachment, specific to the invention and as defined hereinabove, the rooting part of which is connected to the hub by a blade-hub linkage device also specific to the invention and as defined hereinabove.

BRIEF DESCRIPTION OF THE DRAWING

Other advantages and features of the invention will emerge from the description, given hereinbelow without limitation, of embodiments described with reference to the attached drawings, in which:

FIG. 1 is a diagrammatic perspective view with partial cut-away of a blade portion, on the side of its root and of its part for rooting onto a hub, not shown, FIG. 2 is a diagrammatic view, partly in side elevation and partly in section, of a device for linking a blade rooting part similar to that of the blade in FIG. 1 onto a rotor hub, FIG. 3 is a view in diagrammatic section along III—III of FIG. 2 showing a plan shape of the laminate attachment which is different from that of the blade in FIG. 1, FIG. 4 is a diagrammatic view in side elevation of the end of a rooting part of a blade with monostrip torsion bar and of its laminate attachment, FIGS. 5 and 6 are cross sections respectively along V—V and VI—VI in FIG. 4, FIG. 7 is a view similar to FIG. 4 for a rooting part of a blade with multiple torsion bars having two strips of the same cross section, FIG. 8 is a cross section along VIII—VIII in FIG. 7, FIG. 9 is a view similar to FIG. 4 for a rooting part of a blade with multiple torsion bars having three strips of different cross sections, FIG. 10 is a view in cross section along X—X in FIG. 9.

DESCRIPTION OF PREFERRED EMBODIMENTS

Figure 11:
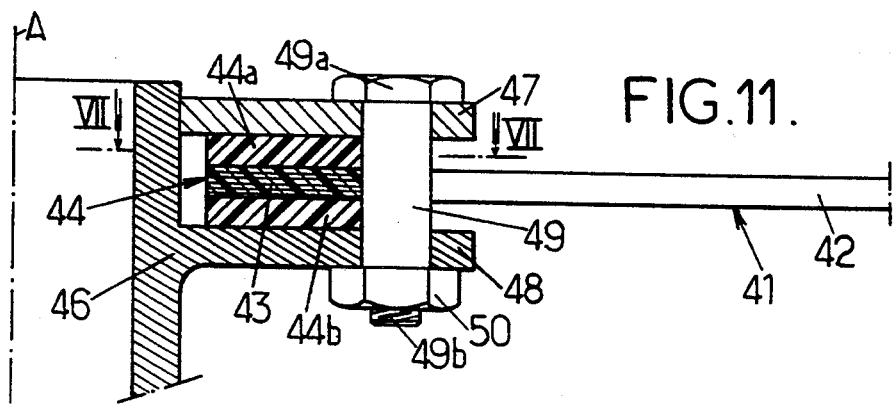
FIG. 11 is a diagrammatic view, partly in section and partly in side elevation, of a device for linking a blade with a rooting part having monostrip torsion bar onto a rotor hub.

The blade 1 in FIG. 1 has its main blade section 2 which is extended, on the side opposite the blade tip (not shown), by a tubular blade root 3, passed through by a rooting part 4, by which the blade 1 is joined to a rotor hub.

In its main blade section 2, the blade 1, essentially made of composite materials, comprises a rigid shell 5, having the shape of the desired aerodynamic profile and elongated longitudinally along the span of the blade, a strengthened framework consisting of a spar 6, which is housed longitudinally in the shell 5, and extends substantially parallel to the longitudinal axis of the blade, and a filling body 7, housed in the shell 5, between the spar 6 and the trailing edge 8 of the blade.

The blade may also comprise a cap, made of titanium or stainless steel, for protecting its leading edge 9, a front filling body and/or composite reinforcements of the front of the blade, which is/are housed in the shell 5 between the spar 6 and the leading edge 9, as well as optionally a bracket for reinforcing the trailing edge 8, which front filling body, front reinforcements, reinforcing bracket and protective cap have not been shown in FIG. 1, in order not to overburden the drawing.

The shell 5 can be produced as described in the aforementioned Patent U.S. Pat. No. 4,626,172, by a stack consisting, from the outside toward the inside of the blade, of two superimposed layers of fabrics made of glass or aramid fibers, arranged such that, for example, their warp yarns are crossed at a right angle and inclined at 45° to the longitudinal axis of the blade, and of two layers of carbon fiber fabric, preferably also crossed and inclined at 45°, all four layers being agglomerated by a rigidified synthetic resin, so as to form a hollow box providing the torsional rigidity of the whole of the blade.

The rear filling body 7, like any optional front filling body, is an element made of a lightweight synthetic material, for example a foam or a honeycombed or cellular material, the external shape of which corresponds to the internal volume of the shell 5, between the spar 6 and the trailing edge 8.

The spar 6 consists of a single hank or bundle of unidirectional and longitudinal fibers with high mechanical strength, which are organic or inorganic, agglomerated by a rigidified synthetic resin, and this hank is arranged in an elongate solid strip of substantially rectangular cross section, and produced, for example, like the spar of the aforementioned Patent U.S. Pat. No. 4,626,172, from rovings of aramid fibers which are agglomerated by a thermoset synthetic resin.

By its upper and lower faces, the spar 6 is rigidly linked, either directly, or via composite base plates, to the shell 5 in which it is received. This spar 6, intended to take up the centrifugal forces stressing the blade 1 in rotation, constitutes, by means of an inner (with respect to the axis of the hub to which the blade is linked) radial end part, the rooting part 4, which leaves the main blade section 2 while passing through the tubular blade root 3.

Figure 20:
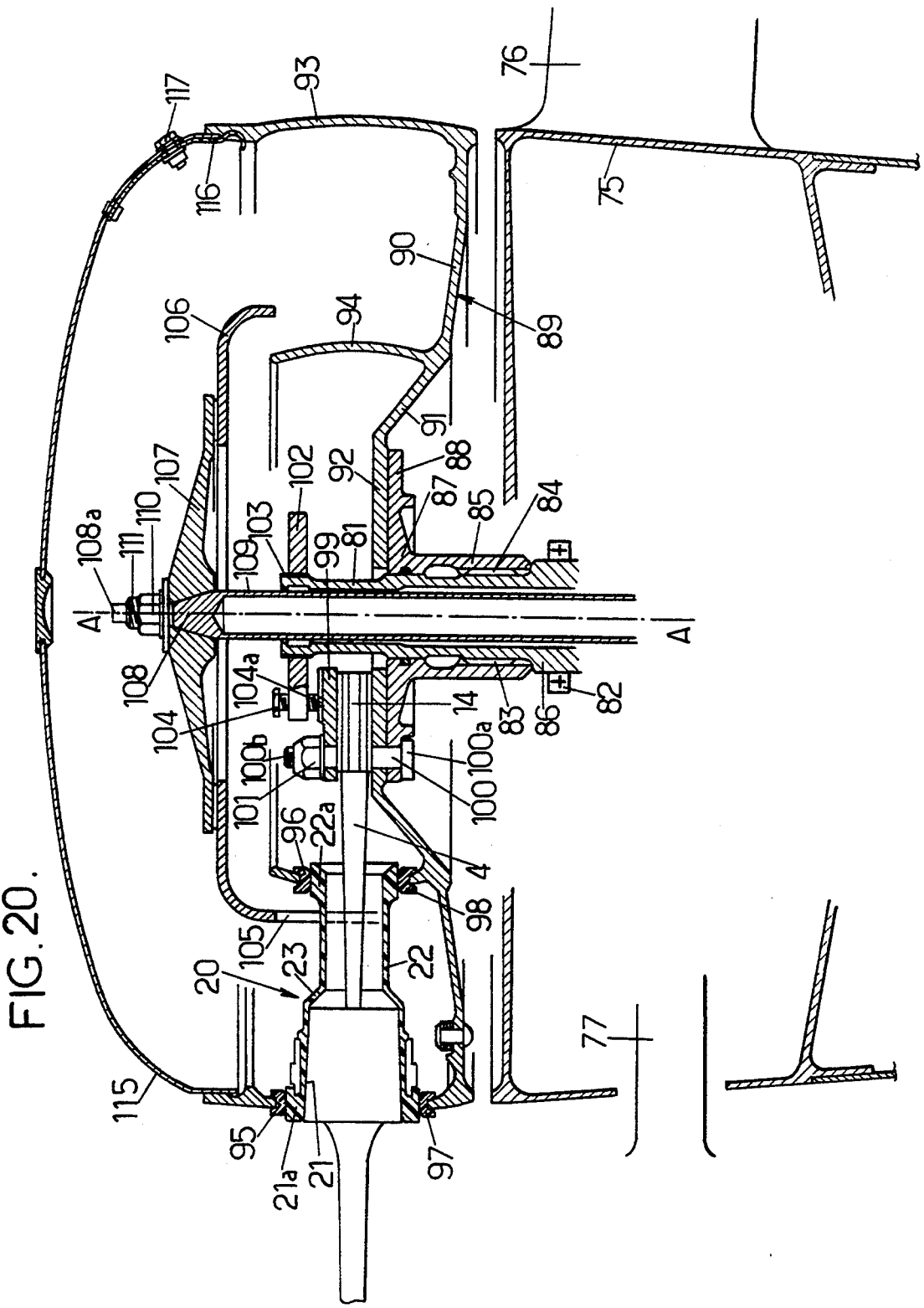
FIG. 20 is a partial axial section of the rotor in FIG. 19.
Figure 21:
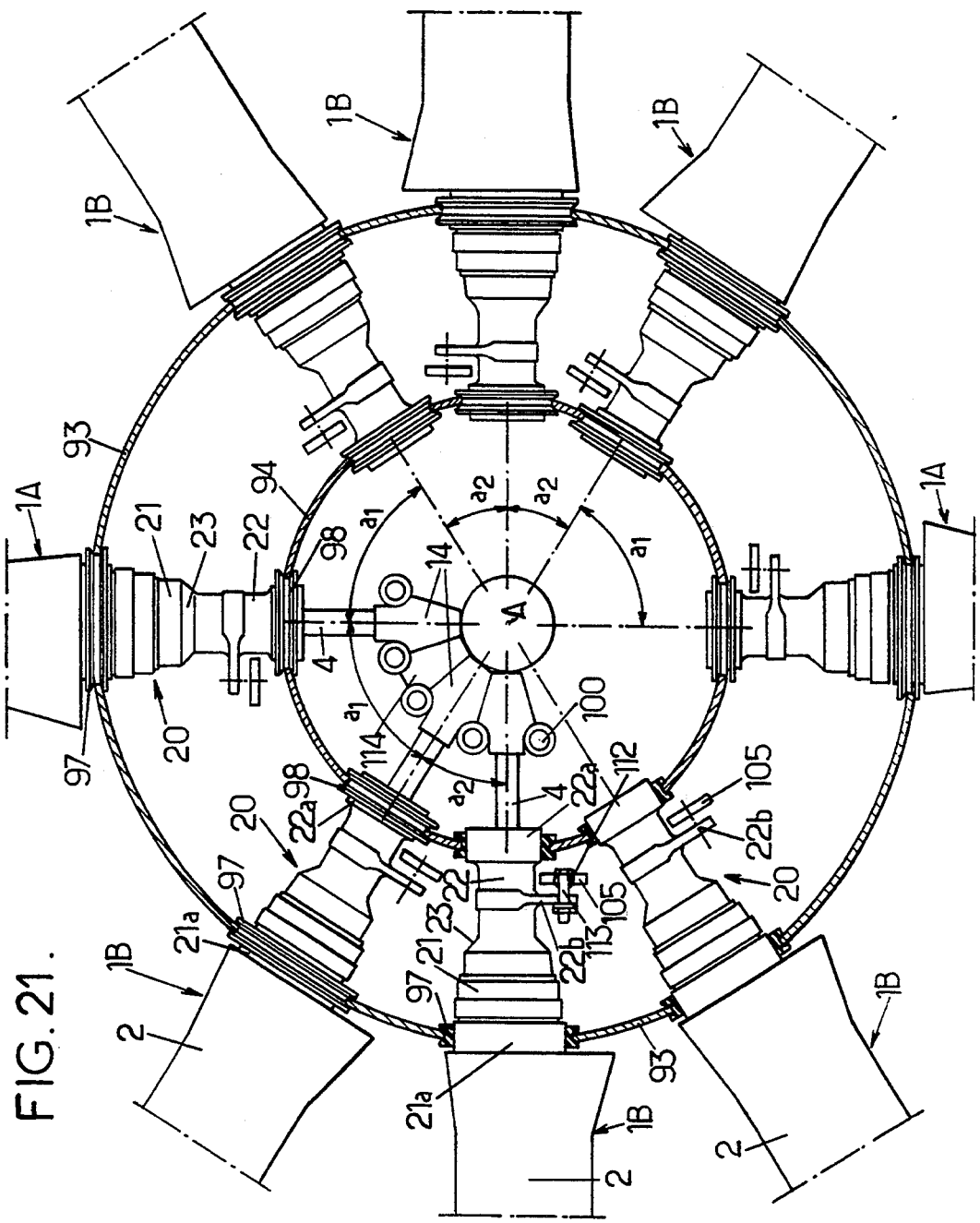
FIG. 21 is a partial radial diagrammatic view, partly in section and partly in side elevation, of the rotor in FIG. 20.

This blade root 3 has a skin made with extensions of the layers of fiber fabrics of the shell 5, and layers of fabric of reinforcing fibers 10 are arranged inside the skin of the blade root 3 in order to give it sufficient thickness. It therefore has the shape of a hollow cylinder, in which the inner (on the side of the rooting part 4) radial end thins progressively, and which is connected by its outer radial end to the main blade part 2 by a transition zone 11 extending over a length close to the chord of the blade 1. The blade root 3 is surrounded by a bearing, to which it is solidly attached, and which consists of a metal cuff for controlling the pitch of the blade, this cuff, not shown in FIG. 1, is represented in FIGS. 20 and 21 and described with reference to the latter.

The rooting part 4, which extends out of the shell 5, passing through the blade root 3, comprises two blade attachment bars 12a and 12b, elongated substantially in the longitudinal extension of the shell 5, and more particularly in the extension of the spar 6, since the two bars 12a and 12b are made by subdividing into two equal halves the single strip constituting this spar 6. Each of the bars 12a and 12b therefore has the same composite structure as the single-strip spar 6, with which it is integral, and the bars 12a and 12b have the shape of two strips of the same rectangular cross section, in which the lower and upper faces of each are two planar and parallel large faces. The two strip bars 12a and 12b move progressively away from each other, in a direction substantially perpendicular to their lower and upper planar faces, from their end for connection to the spar 6 to their opposite linkage end portion 13a or 13b, by which the strips 12a and 12b, each twistable about its longitudinal axis, are solidly attached to each other and intended to be joined to the rotor hub by a laminate attachment 14.

The laminate attachment 14 comprises three laminate elements, respectively upper 14a, lower 14b and intermediate 14c, which are plumb above each other, such that the end linkage portion 13a of the upper strip 12a is sandwiched between the upper 14a and intermediate 14c laminate elements, and the linkage end portion 13b of the lower strip 12b is sandwiched between the intermediate 14c and lower 14b laminate elements. Each of the laminate elements 14a, 14b and 14c consists of a stack of several layers, for example ten to twenty layers, of inorganic or organic reinforcing fibers, with high mechanical strength, which are agglomerated by a rigidified synthetic resin. In each layer of fibers of the laminate elements, the fibers are arranged in a substantially flattened structure, which may be a nonwoven structure, a mat of fibers, a mesh of fibers or, preferably, a fiber fabric preimpregnated with the resin. Preferably, the reinforcing fibers of the layers or laminas of the laminate elements 14a, 14b, 14c, and the resin for agglomerating these fibers are respectively of the same nature as, or, at the very least compatible with, the fibers and the synthetic agglomerating resin constituting the strip torsion bars 12a and 12b, which can be produced, like the spar 6, in the form of a bundle of bonded rovings or by the superposition of plies of unidirectional fibers which are preimpregnated with resin, for example sixteen plies of fibers, each having a thickness of approximately 0.13 mm, for each of the two strips 12a and 12b. In this case, each of the laminate elements 14a, 14b, 14c, consists for example of a stack of fifteen to twenty laminas or layers of fiber fabric, in which the directions of the weft yarns and of the warp yarns are inclined by approximately 45° to the longitudinal direction of the torsion strip 12a or 12b, which is itself substantially aligned on the longitudinal axis of the blade 1.

The three laminate elements 14a, 14b, 14c have, seen in plan, the same laterally flared shape of the two sides of the linkage end portions 13a and 13b, which are of substantially rectangular shape in the extension and at the end of the strips 12a and 12b.

The flared shape of each laminate elements 14a, 14b, 14c, with respect to the end linkage portions 13a and 13b, is defined by the side faces of these elements, which project sideways with respect to the end portions 13a and 13b and which have, in the part of each laminate element which points toward the shell 5, a concave region 15, with concavity pointing sideways on one or other side of the blade and toward the shell 5 of the latter, while in the end part of the laminate elements 14a, 14b and 14c which points to the side opposite the blade, the side faces of these laminate elements have planar regions which converge with each other, defining on the laminate elements an end part of substantially trapezoidal shape, the extension of these planar and convergent regions 16 of the side faces intersecting preferably substantially at the axis of rotation of the rotor on whose hub the blade is intended to be mounted.

In order to fill the space defined between two neighboring laminate elements 14a, 14b and 14c, by the parts of these two neighboring elements which project with respect to the linkage end portions 13a and 13b, the laminate attachment 14 also comprises four laminate side filling elements, two of which, 17a, are each arranged bearing against one of the side faces of the linkage end portion 13a, and sandwiched between the projecting side parts of the upper 14a and intermediate 14c laminate elements, and the other two, 17b, of which are each arranged bearing against one of the side faces of the linkage end portion 13b and sandwiched between the laterally projecting parts of the intermediate 14c and lower 14b laminate elements. The laminate side filling elements 17a and 17b have a laminate structure similar to that of the other laminate elements 14a, 14b, 14c, and their side faces opposite the one by which they are each applied against one of the linkage end portions 13a and 13b also have, like the side faces of the laminate elements 14a, 14b and 14c, a concave region 18, which is in the extension of the concave regions 15 of the laminate elements 14a, 14b, 14c, as well as a planar region 19, which is in the extension of the planar region 16 of the laminate elements 14a, 14b, 14c, and which is therefore convergent with the planar region 19 of the other corresponding laminate side filling element 17a or 17b.

The rigidifying of the agglomeration or impregnation resin or resins of the various layers of fibers of the various laminate elements 14a, 14b, 14c, 17a and 17b, and of the rovings or plies of unidirectional fibers of the torsion sheets 12a and 12b, as well as of their linkage end portions 13a and 13b, solidly binds all the laminate elements of the attachment 14 to the linkage end portions 13a and 13b of the two torsion strips 12a and 12b of the rooting part 4 of the blade 1.

The mode of employment of a blade 1 on a rotor, and in particular the mode of linkage of such a blade 1 by its laminate attachment 14, are described hereinbelow with reference to FIGS. 2 and 3.

In these Figures, a diagrammatic representation has been given of a blade rooting part 24 similar to the multibar rooting part 4, with two torsion strips, of the blade in FIG. 1.

The two strip bars 32a and 32b, which are composite and elongate and have a rectangular section in which the longest dimension extends substantially along the chord of the blade, and are spaced apart in a direction substantially perpendicular to the longest dimension of their cross section, are two strips which can be twisted about their respective longitudinal axis, so that the rooting part 24 is, in its entirety, twistable about a longitudinal axis substantially parallel to or coincident with the longitudinal axis of the blade. This rooting part 24 carries, at its rear end, on the side opposite the shell of the blade, a laminate attachment 34, of which the upper 34a, lower 34b and intermediate 34c laminate elements, of the same laminate structure as the laminate elements of the attachment 14 of the blade in FIG. 1, are solidly bound by rigidifying the agglomeration resin or resins to the end linkage portions 33a and 33b of the two torsion strips 32a and 32b.

In contrast to the laminate attachment 14 in FIG. 1, the laminate elements 34a, 34b and 34c of the laminate attachment have a plan shape which is substantially square or rectangular, the length of which, considered perpendicularly to the longitudinal direction of the strips 32a and 32b, is greater than the width of these strips, so that the laminate attachment 34 is indeed laterally flared on both sides with respect to the strips 32a and 32b. Of course, laminate side filling elements are advantageously arranged, in this example also, against the two side faces of the end linkage portions 33a and 33b of the two strips, and between the two laminate elements 34a and 34c or 34c and 34b between which each end portion 33a or 33b is fixed and sandwiched.

Two cylindrical recesses 35 are made in superposition in the three laminate elements 34a, 34b, 34c symmetrically on either side of the longitudinal axis of the strips 32a and 32b, and in correspondence with the semicylindrical recesses made in the laminate side filling elements, as well as with recesses of the same shape made laterally in the strips 32a and 32b, or in correspondence with transverse narrowings of these strips, so that the laminate attachment 34 and the linkage end portions 33a and 33b to which it is solidly attached can be clamped and held in a radial grip opening toward the outside and defined on a hub 36 by two plates 37 and 38 of this hub. The laminate attachment 34 and the rooting part 24 are held by two parallel pins or spindles 39 which pass through the cylindrical recesses 35 in the laminate elements of the attachment 34 as well as the recesses or narrowings of the side filling elements and in the two end linkage portions 33a and 33b, and coaxial holes made in the radial plates 37 and 38 of the hub 36.

The removable nature of the rooting part 24 and of its laminate attachment 34 on the hub 36 is easily obtained if the holding pins or spindles 39 consist of the shanks of bolts which bear via their head 39a against the upper face of the upper radial plate 37 of the hub 36, while a nut 40 is screwed onto the threaded end 39b of the pins 39 which projects under the lower face of the lower radial plate 38 of the hub 36, the nut 40 being tightened against this lower plate 38.

Thus, the blade including the rooting part 24 is joined to the hub 36 by a blade-hub linkage device which comprises, on the one hand, the laminate attachment 34 solidly attached to the rooting part 24 of the blade and, on the other hand, the two removable pins or spindles 39 removably joined to the hub 36 and constituting means for holding the laminate attachment 34 and the corresponding blade to the hub 36, by being located on either side of the blade attachment torsion strips 32a and 32b, at their end portions 33a and 33b for linkage to the laminate attachment 34, the shape of which is such that it bears against the two pins 39.

In use, the centrifugal forces which stress the blade induce, in its rooting part 24, axial forces in the torsion bars 32a and 32b, which leads the solidly attached combination of the laminate attachment 34 and the end linkage portions 33a and 33b of the bars 32a and 32b to abut, toward the shell, against the pins 39 constituting the means for holding the laminate attachment 34 and the blade to the hub 36. The transmission in the hub 36 of the forces coming from the torsion bars 32a and 32b of the rooting part 24 occurs successively at two levels. The transfer of the axial forces of the torsion bars 32a and 32b in the layers of fibers of the laminate elements 34a, 34b and 34c of the laminate attachment 34 occurs by shearing of the linkage interfaces between the bars 32a and 32b, and in particular their end linkage portions 33a and 33b, and the layers of fibers of the laminate elements. It is for this reason that it is recommended for the layers of fibers of the laminate elements to be layers of fabrics in which the fibers are oriented along the directions of the weft and of the warp, which are inclined substantially at 45° to the longitudinal axis of the bars 32a and 32b, which ensures optimal behavior of these layers of fibers for shear strength. Also for this reason, it is advantageous for the laminate side filling elements also to consist of a stack of layers of fiber fabrics in which the directions of the weft and of the warp are inclined in the same manner.

At the second level, the transfer of forces of the layers of fibers of the laminate elements of the attachment 34 in the pins 39 for holding to the hub 36 occurs by shearing, tension and compression in the layers of fibers.

In FIG. 2, 25 indicates the shear planes at the interfaces between the end linkage portions 33a and 33b of the torsion strips 32a and 32b and the laminate elements of the attachment 34, while in FIG. 3, 26, 27 and 28 respectively indicate the shear planes, compression region and tension plane in the transmission of the forces of the laminate elements of the attachment 34 to the hub 36 by the two pins 39 situated on either side of the torsion bars 32a and 32b.

It is clear that the blade 1 in FIG. 1 can be mounted on a hub such as 36 in FIG. 2, in the same manner, if the concave side faces or side edges 15 and 18 of the laminate elements of the attachment 14 have bearing faces of shapes complementary with parts of the peripheral surfaces of the pins 39 against which these bearing faces abut, that is to say if the concave faces 15 and 18 are for example in the shape of a quarter of the side surface of a cylinder with substantially the same radius as the cylindrical pins 39 for holding to the hub 36. Furthermore, in this case, it is sufficient for one of the pins 39 to be removable in order to allow optional unfitting of the corresponding blade by unclamping its laminate attachment from the grip for holding on the hub.

FIGS. 4, 5 and 6 diagrammatically represent a rooting part of a monobar blade 41, which consists of a single torsion strip 42 extending the blade spar out of the shell of this blade. In this monostrip variant of the multibar or multistrip rooting parts of FIGS. 1 and 2, the laminate attachment 44 comprises an upper laminate element 44a and a lower laminate element 44b, between which the end linkage portion 43 of the single torsion strip 42 is sandwiched and fixed by the rigidified agglomeration resin. As represented in FIG. 6, the laminate attachment 44 also comprises laminate side filling elements 47, each of which is solidly attached by the rigidified resin to a side face of the strip 42 as well as to the side parts, projecting with respect to this strip 42, of the two laminate elements 44 and 44b.

FIGS. 7 and 8 represent a variant of the embodiment in FIG. 2, insofar as the blade rooting part 24' retains a multibar structure with two strips 32'a and 32'b of identical and rectangular cross section, the end linkage portions 33'a and 33'b of which are sandwiched and fixed between the laminate elements 34'a, 34'c, 34'b of the laminate attachment 34'. But in addition, in order to guarantee correct relative positioning of the two strips 32'a and 32'b during the manufacturing process of the blade, and in particular during the phase of rigidifying the resin or resins for agglomerating all the constituent elements of the rooting part 24' and of its laminate attachment 34', an intermediate element 29, made for example of elastomer, is intended to be fitted permanently between the parts of the two torsion strips 32'a and 32'b which are adjacent to their end linkage portions 33'a and 33'b. This intermediate element 29 acts not only as a positioning tool during the manufacturing process, but can also act as a torsion damper, when the two strips 32'a and 32'b are stressed in torsion about their longitudinal axis, in order to prevent any contact of the two strips with each other, which might cause delamination along the contact edge. For the same reason, the intermediate laminate element 34'c of the attachment 34' is sufficiently thick to prevent any contact between the two strips 32'a and 32'b in the event of torsion of the rooting part 24'.

FIGS. 9 and 10 represent a multibar blade rooting part 51 with three torsion strips of different sections, which all result from subdividing one and the same bar forming a single blade spar. In this variant, the upper 52a and lower 52b strips are rectangular strip with identical cross sections, arranged with spacing on either side of a central strip 52c with a rectangular section which is larger than the two others, although having substantially the same thickness. The end linkage portions 53a, 53b and 53c of these three strips are each sandwiched and fixed between two of the four laminate elements 54a, 54b, 54c, 54d of the laminate attachment 54, the elements 54c and 54d of which are intermediate elements.

In the variants described in FIGS. 4 to 10, it is to be understood that the corresponding laminate attachment always has parts in lateral projection on both sides with respect to the strip or to the torsion strips of the rooting part, so that, by virtue of its shape, this laminate attachment, can always abut, toward the shell of the corresponding blade, against members for holding on the hub, such as the pins 39 in FIG. 2.

Obviously, a number of other multistrip or multibar structures of identical or different sections are possible for the rooting part. But when the bar or bars of the rooting part do not have the shape of a strip, it is nevertheless preferable for their end linkage portions to be substantially flattened in order to be able to be integrated favorably in the laminate structure of the corresponding attachment.

Figure 12:
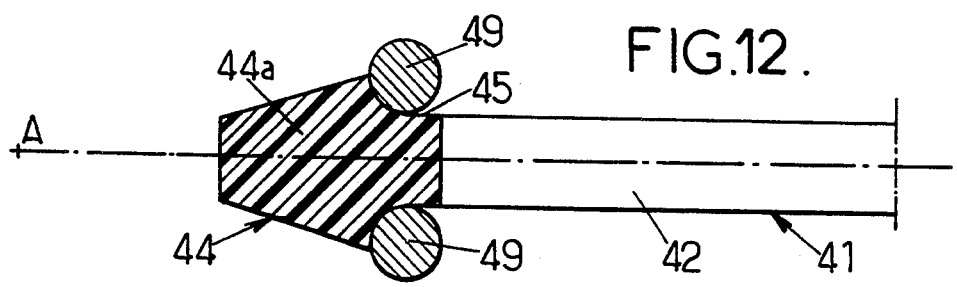
FIG. 12 is a section along XII—XII in FIG. 11, and represents the plan shape of the laminate attachment and of the strip of the torsion bar of the blade.

FIGS. 11 and 12 diagrammatically represent the linkage to the hub 46 of the blade rooting part 41 in FIGS. 4 to 6, in which the two laminate elements 44a and 44b of the corresponding attachment 44 have, in plan, the shape of the laminate elements of the attachment 14 in FIG. 1 on each side of the single torsion strip 42, the end linkage portion 43 of which is sandwiched and fixed between the laminate elements 44a and 44b of the attachment 44. The latter has a laterally projecting flared part, defined on each side by a concave side face 45, in the shape of a quarter of the side surface of a cylinder, extended by a planar side face which converges toward the longitudinal axis of the strip 42 and on the side opposite the latter. The laminate attachment 44 and the end linkage part 43 of the strip 42 can also be clamped in a grip defined between a lower radial plate 48, in the shape of an annular disk solidly attached to the tubular hub body 46, and an upper plate 47, also in the shape of an annular disk, mounted sliding about the hub body 46. The upper radial plate 47 is solidly attached to the hub 46, and the attachment 44 and the end part 43 are held in the grip thus defined by two bolts 49, each passing through two coaxial holes, one made in the upper plate 47 and the other in the lower plate 48, and against which the laminate attachment 44 abuts via the concave side faces 45 bearing against the corresponding parts of the periphery of the bolts 49. The latter bear via their head 49a against the upper face of the upper plate 47 and receive, on their threaded end 49b projecting below the lower plate 48, a nut 50, the screwing of which makes it possible to clamp the laminate attachment 44 between the two plates 47 and 48, while solidly attaching the upper plate 47 to the rest of the hub.

When the laminate attachments have the shape represented in FIGS. 1 and 12, with an end part, on the side opposite the torsion bar(s), which has a trapezoidal plan shape with inclined sides converging toward the axis of rotation of the rotor on which the corresponding blades are mounted, it is possible advantageously to combine, side-by-side, the laminate attachments and the torsion bars of several neighboring blades. Two variants of this type are diagrammatically represented in FIGS. 13 and 14.

Figure 13:
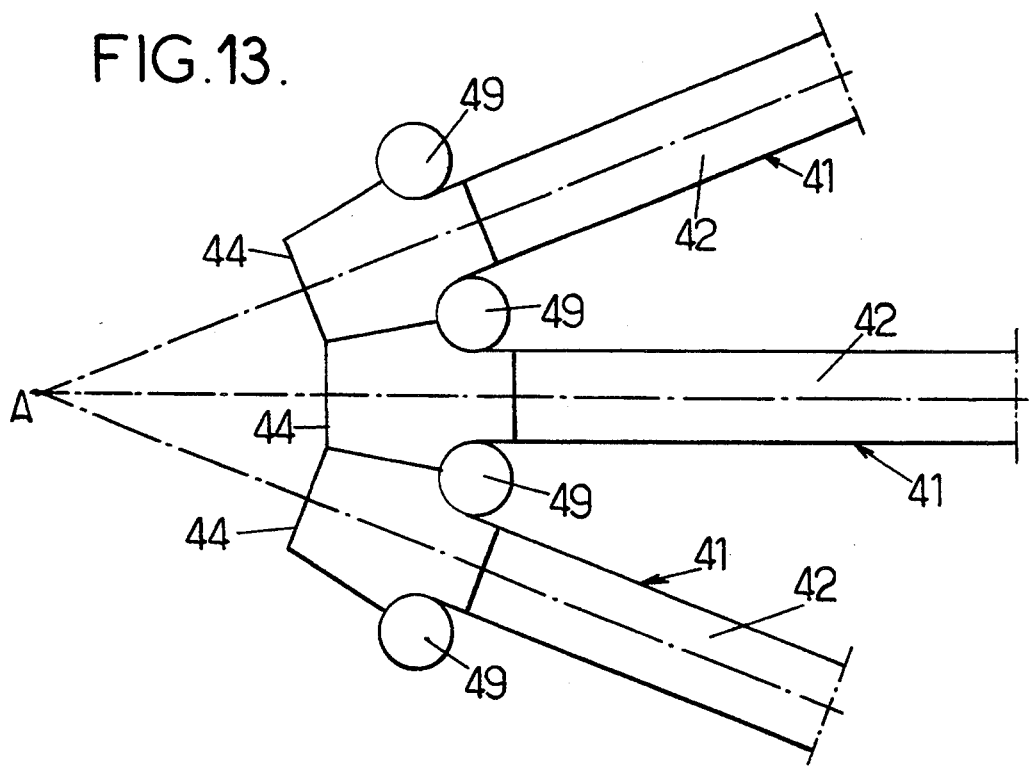
FIGS. 13 and 14 are two diagrammatic top views of two examples of blade-hub linkage devices combining several rooting parts of neighboring blades of one and the same rotor and their laminate attachments.

FIG. 13 represents the rooting parts 41 with a single torsion strip 42 solidly attached to a laminate attachment 44 of three neighboring blades of a multiblade rotor. By virtue of the trapezoidal shape given in plan to the end part of each laminate attachment 44, on the side opposite the corresponding strip 42, and because of the geometrical condition according to which the opposite inclined sides of this trapezoidal part converge toward each other so that their extensions intersect at the axis A of rotation of the rotor, the laminate attachments 44 of the three blades can be bonded side-by-side by their side faces, at these trapezoidal parts, and two laminate attachments 44 thus bonded bear via the facing concave parts of their side faces against one and the same pin 49 for holding on the hub of the rotor. Thus, the laminate attachments 44 linked to two adjacent blades abut against a common holding means. If the laminate attachments 44 of all the blades of the rotor are thus bonded in pairs by their side faces, the number of the pins 49 for holding all the blades on the hub is equal to the number of blades, an excellent radial positioning of the blades is ensured by the holding, toward the outside, of the laminate attachments in abutment against the holding pins 49, while, radially inward, the laminate attachments 44 are blocked by the wedge shape given to them by their trapezoidal parts. Furthermore, such mounting retains the individually removable nature of each blade.

Figure 14:
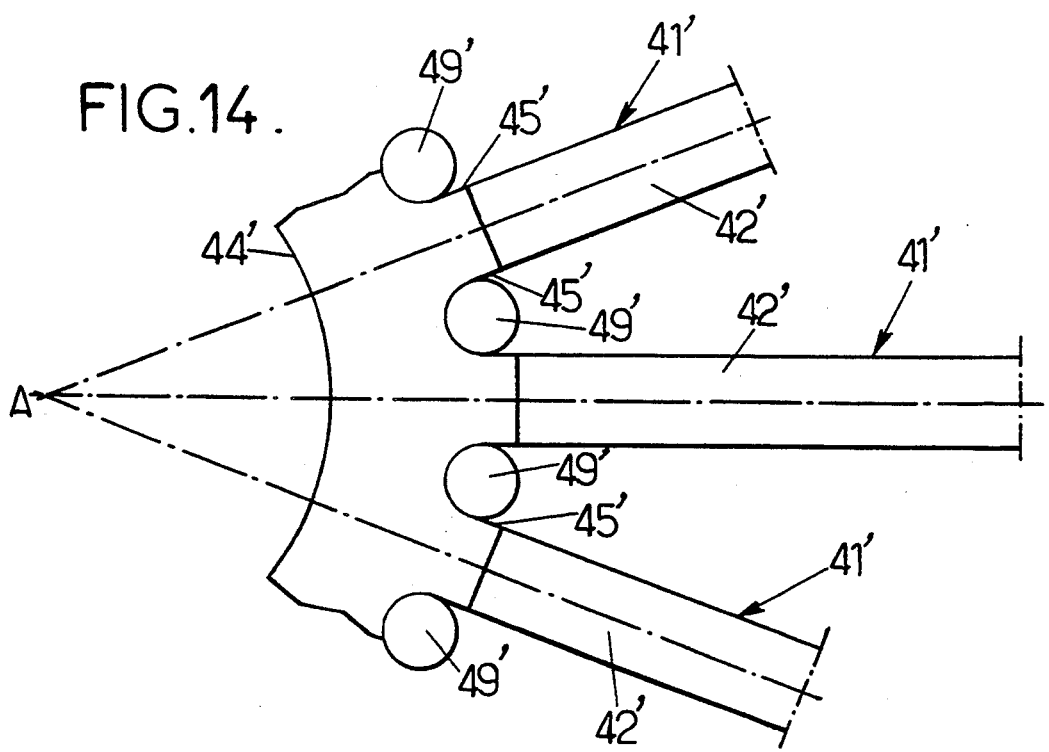

In FIG. 14, as in FIG. 13, the torsion bars 42' of the rooting parts 41' of several neighboring blades of the rotor are arranged so that their longitudinal axes intersect on the axis of the rotor A. However, in contrast to the embodiment in FIG. 13, the laminate attachments of the various blades in question consist of one single laminate attachment 44', solidly attached simultaneously to all the end linkage portions of the various bars 42' of the blades in question, which may be some neighboring blades of the rotor or all of the blades of the latter.

When all the blades of the rotor are linked by their rooting part 41' to one and the same laminate attachment 44', the latter has the shape of a complete annular disk, consisting of the superposition of an upper laminate element, a lower laminate element and optionally an intermediate laminate element or intermediate laminate elements, when each rooting part 41' includes several torsion bars 42', the end linkage portions of the bars 42' each being sandwiched and fixed between two adjacent laminate elements of the attachment 44', and each of the laminate elements itself comprising a stack of layers of fiber fabrics in the shape of annular disks pre-impregnated with a rigidified synthetic agglomeration resin, side filling elements filling the spaces defined, laterally or circumferentially around the axis of rotation A of the rotor, between the end linkage portions of two neighboring bars 42' of two adjacent blades and, axially or along the thickness of the attachment 44', between two neighboring laminate elements in the shape of annular disks.

In its outer radial periphery, the annular disk of the attachment 44' has concave recesses 45', open radially outward, and of substantially semicylindrical shape, which delimit bearing surfaces of the laminate attachment 44' in radial abutment outward, against the pins 49' for holding the attachment 44' on the hub.

In this example, the laminate attachment 44', which is common to all the blades, provides a degree of balancing of the forces, especially centrifugal forces, which stress the various blades, and the number of holding pins 49' is equal to the number of blades.

But it is also possible for the laminate attachment 44' to be common only to some neighboring blades of the rotor. In this case, it consists of only a portion of the annular disk described hereinabove, and extends circumferentially over an angular sector delimited between two radial planes, each passing through the axis A of rotation of the rotor and through the axis of one, respectively, of the two cylindrical pins 49', which are located on either side of the set of neighboring blades in question.

Advantageously, the blades of the rotor are then grouped in subassemblies, each comprising the same number of blades, so that the corresponding laminate attachments extend over identical portions of the annular disk, and so that their side-by-side arrangement about the axis A of the rotor reconstructs a complete annular disk.

In the embodiments in FIG. 14, it is advantageous for the individually removable nature of each blade to be retained at a removable linkage of its rooting part 41' with the rest of the blade, as described for example hereinbelow with reference to FIGS. 17 and 18.

Figure 15:
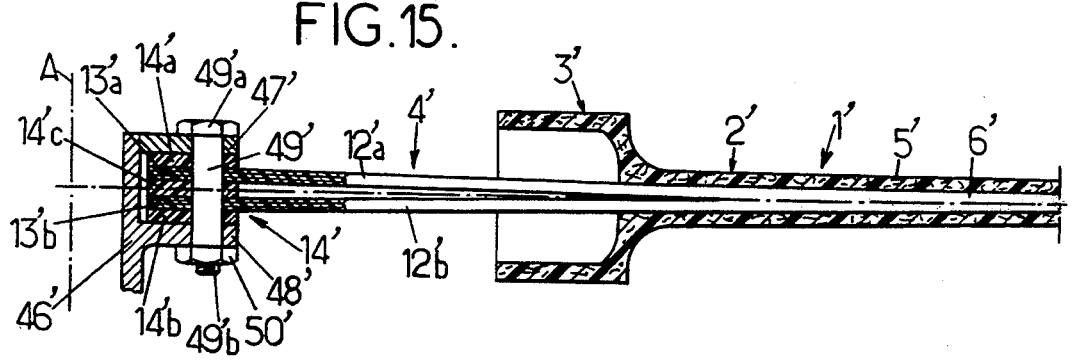
FIG. 15 is a view similar to FIG. 11 for a composite blade with torsion bars integrated with the framework of the blade, such as that of FIG. 1, intended for equipping a helicopter ducted tail rotor.
Figure 16:
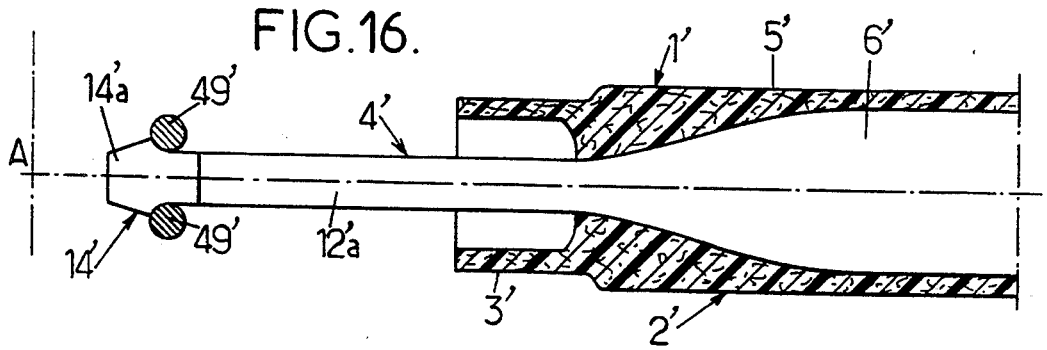
FIG. 16 is a view similar to FIG. 12 for the blade in FIG. 15.

FIGS. 15 and 16 diagrammatically represent a blade 1', with structure very close to that of the blade 1 in FIG. 1, as well as its mounting on a hub, the structure of which is similar to that of the hub in FIG. 11.

Just like the blade 1 in FIG. 1, the blade 1' in FIGS. 15 and 16 is an essentially composite blade, the rooting part 4' of which, being multibar with two torsion strips 12'a and 12'b of identical rectangular sections, is integrated with the strengthened framework of the blade 1'.

At this level, the only essential difference between the two blades 1 and 1' is that the strengthened framework of the blade 1' consists of a spar 6' in the form of a bundle of unidirectional and longitudinal rovings which are agglomerated by a rigidified resin, and which is spread out in the rigid composite shell 5', in a direction extending substantially along the chord of the blade 1'.

This spread bundle 6' is concentrated toward the longitudinal axis of the blade 1' in the vicinity of the substantially cylindrical tubular blade root 3', and is subdivided at this level into two halves forming the two torsion strips 12'a and 12'b, which move progressively away from each other, passing through the blade root 3', and as far as the laminate attachment 14', the structure of which is identical to that of the laminate attachment 14 of the blade in FIG. 1, and is solidly attached in the same manner to the end linkage portions 13'a and 13'b of the two torsion strips 12'a and 12'b.

In the main blade section 2' of the blade 1', the volume or volumes internal to the shell 5', not occupied by the spar 6', is or are preferably occupied by at least one filling body, located between the spar 6' and the shell 5'.

As regards the linkage to the hub, the laminate attachment 14' and the end linkage portions 13'a and 13'b of the torsion strips which are solidly attached thereto, the first between the upper 14'a and intermediate 14'c laminate elements of the attachment 14', and the second between the intermediate 14'c and lower 14'b laminate elements of this attachment 14', are clamped and held in a radial grip, open outward, on the hub. The latter consists of a tubular central hub body 46', with its axis merged with the axis of rotation A of the rotor, to which a lower radial hub plate 48' is solidly attached. The hub also includes an upper radial hub plate 47', which is an annular piece of axis A and mounted axially movable about the body 46'. This upper plate 47' is held on the body 46' and its lower plate 48' by screw-nut assembly pairs, each comprising a bolt 49', with head 49'a applied against the upper face of the upper plate 47', and with the threaded end 49'b of the shank projecting under the lower plate 48', and receiving a nut 50' screwed onto it. As in the example in FIGS. 11 and 12, the laminate attachment 14' is in abutment, radially outward, against the shanks of the bolts 49' via the substantially semicylindrical concave recesses of the side parts of the laminate elements 14'a, 14'b and 14'c, projecting laterally on both sides with respect to the torsion strips 12'a and 12'b.

Figure 17:
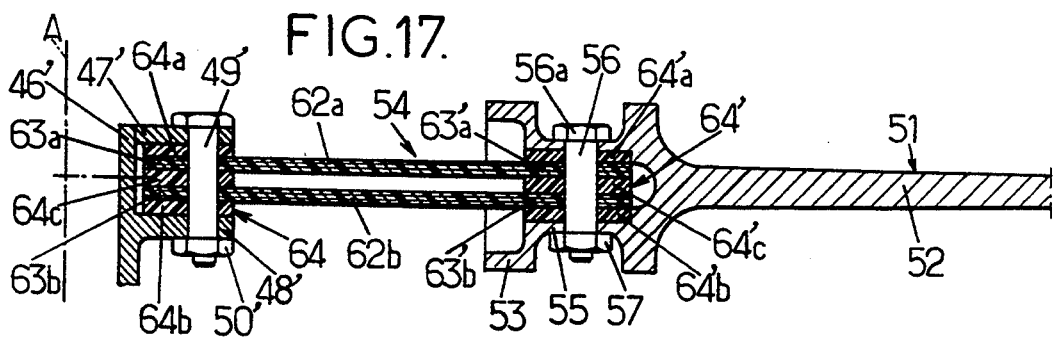
FIG. 17 is a view similar to FIG. 15 for a metal blade, the framework of which is independent of its rooting part with torsion bars.
Figure 18:
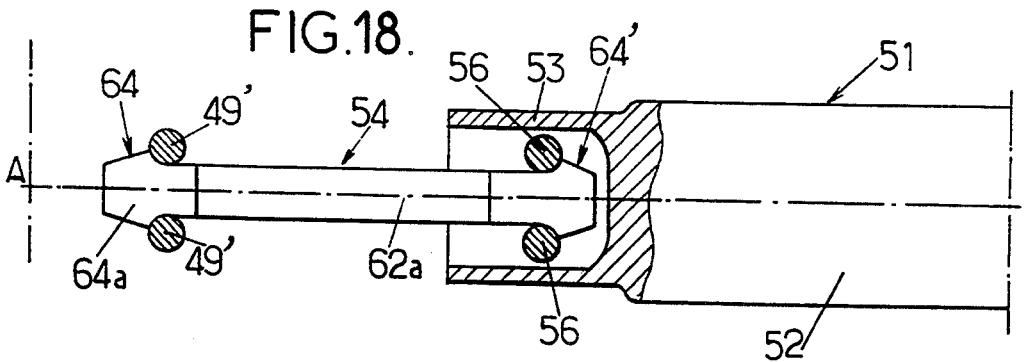
FIG. 18 is a view similar to FIG. 16 for the metal blade in FIG. 17, also intended for equipping a helicopter ducted tail rotor.

FIGS. 17 and 18 diagrammatically represent a metal blade 51, provided with a rooting part 54 whose structure is independent of the strengthened framework of the blade 51, but which is connected to the blade 51 by removable linkage means. In order to simplify the representation of this blade, in FIG. 17 its metal spar occupies the entire thickness of its shell, which is extended on the side of the rooting part 54 by a tubular blade root 53 with a base closed on the side of the main blade section 52 of this blade.

The rooting part 54 comprises two composite, elongate torsion bars 62a and 62b, which consist of two identical strips arranged on top of each other but separated from each other and parallel, having a rectangular cross section in which the longest section dimension is oriented from the front to the rear of the blade, perpendicularly to its longitudinal axis. Each strip consists of an independent bundle of unidirectional and longitudinal rovings of inorganic or organic fibers which are agglomerated by a synthetic rigidifying resin.

By their end linkage portions 63a and 63b, on the side opposite the blade root 53, the two torsion strips 62a and 62b are solidly attached to one and the same laminate attachment 64, the structure of which is similar to that of the laminate attachment 14' in FIGS. 15 and 16, and is linked in the same manner and by the same means to a rotor hub. The end linkage portion 63a of the upper strip 62a is therefore again sandwiched and fixed between the upper 64a and intermediate 64c laminate elements of the attachment 64, and the end linkage portion 63b of the lower strip 62b is similarly sandwiched and fixed between the intermediate 64c and lower 64b laminate elements of this attachment 64, which is clamped in the grip formed on the hub body 46' by the lower 48' and upper 47' hub plates, the latter being linked to the rest of the hub by bolts 49' and fastening nuts 50', the laminate attachment 64 being in radial abutment toward the outside against the shanks of these bolts 49'.

By their end portions 63'a and 63'b, which are on the side of the blade root 53, and which act as end portions for linking to this blade root 53, the two torsion strips 62a and 62b are also solidly attached to a second laminate attachment 64', with a structure entirely similar to that of the laminate attachment 64, but made symmetrically with the latter with respect to the center of the rooting part 54. More precisely, this second laminate attachment 64' comprises three laminate elements 64'a, 64'b, 64'c, each of which consists of a stack of several layers of inorganic or organic fibers, which are agglomerated by a synthetic rigidifying resin, and such that the end portions 63'a and 63'b for linking the torsion strips 62a and 62b to the blade 51 are sandwiched and fixed, the first between the upper 64'a and intermediate 64'c laminate elements, and the second between the intermediate 64'c and lower 64'b laminate elements.

This second laminate attachment 64' and the end portions of the torsion strips 62a and 62b which are solidly attached to it are clamped in a grip defined in the tubular blade root 53 by a central drawn-in part 55 of this blade root 53. The laminate attachment 64' for removable linkage to the blade 51 is held in this grip 55 by screw-nut assembly pairs, comprising bolts 56, each of which passes through the coaxial holes made in the two facing parts of the grip 55, and bears by its head 56a against the upper part of this grip 55, while a nut 57 is screwed onto the threaded end of its shank which projects under the lower part of this grip 55. Since the laminate elements of the attachment 64' have the same plan shape as the laminate elements of the attachment 64, with parts projecting laterally on both sides with respect to the two strips 62a, 62b, and defined by concave recesses, with concavity pointing toward the outside of the bar, the laminate attachment 46' is held in radial abutment toward the hub 46' against the shanks of these bolts 56.

Of the two bolts 56 or pins for holding the second laminate attachment 64' in the grip 55 of the blade root 63, it is necessary for at least one to be mounted removably to make it possible to unfit the blade 51 by detachment between its blade root 53, integrated in this example with the strengthened framework of the blade, and the end of its rooting part 54 which is radially external with respect to the axis of rotation of the hub.

In such an embodiment, each of the two laminate attachments 64 and 64' thus has a flared portion by which it bears against the means which hold it respectively on the hub and in the blade root.

The blades and the blade-hub linkage devices described hereinabove with reference to FIGS. 1 to 18 advantageously find application for equipping variable-pitch multiblade rotors which are used as ducted tail rotors on helicopters.

A particular example of such a ducted tail rotor is described hereinbelow with reference to FIGS. 19 to 21.

Figure 19:
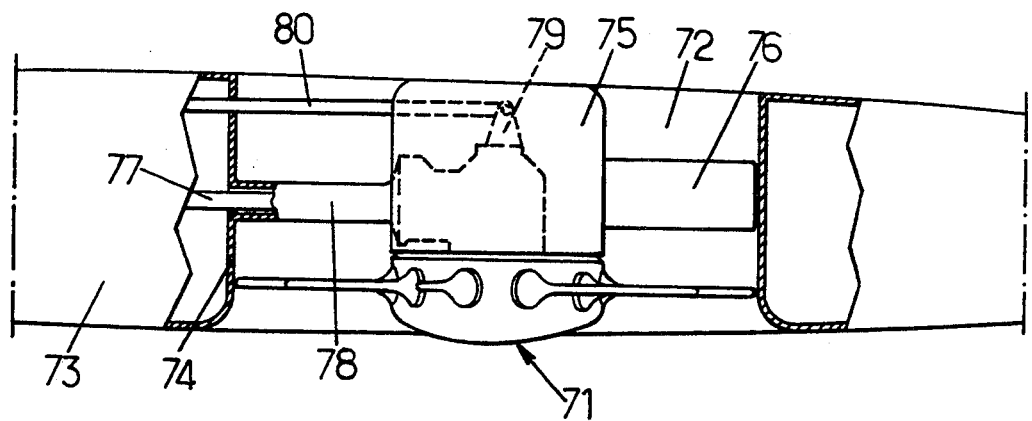
FIG. 19 is a substantially horizontal section of the rear part of the fuselage or of the empennage of a helicopter equipped with a ducted anti-torque or tail rotor according to the invention.

In FIG. 19, the multiblade rotor used as an antitorque tail rotor is given the overall reference 71. This tail rotor 71 is mounted and driven in rotation in a substantially vertical tunnel or window 72, the shape of whose cross section is slightly frustoconical, and which is defined in the rear part of the fuselage or of the empennage 73 of a helicopter by a fairing 74. In the tunnel 72, the rotor 71 is supported and driven by an auxiliary transmission gearbox 75, housed in a double-walled casing, of cylindrical general shape, held at the center of the tunnel 72 by a support including several faired radial arms 76, The auxiliary transmission gearbox 75, which is, for example, as described and represented in French Patent FR-1,593,008, which may advantageously be referred to for more information, includes a bevel gearing, the primary gear of which is driven by a transmission shaft 77, joining the main transmission gearbox to the auxiliary transmission gearbox 75, and passing through a hollow arm 78 joining the fairing 74 to the casing of the auxiliary transmission gearbox 75. The latter also encloses an angle gearbox 79, acted on by a collective pitch control rod 80 for the blades of the rotor 71, in order to move, parallel to the axis of the tunnel 72, a collective pitch control shaft described hereinbelow. The angle gearbox 79 and the rod 80 have been diagrammatically represented as in FIG. 1 of the aforementioned patent, for the purpose of clarity, but the rod 80 may optionally also pass through the hollow arm 78.

With reference to FIGS. 20 and 21, the rotor 71 comprises a tubular central shaft 81, substantially coaxial with the tunnel 72, and mounted in rotation about the axis A of the tunnel 72 by bearings, such as 82, housed in the auxiliary transmission gearbox 75. The shaft 81 is driven in rotation, in a manner which is not shown, by external axial splines of a shaft part 81 received in the casing of the auxiliary transmission gearbox 75, and which engage with corresponding splines of the secondary bevel gear of the bevel gearing housed in this transmission gearbox 75, this secondary gear being itself mounted in rotation in the gearbox 75 in an appropriate manner, for example by a roller bearing. In its part emerging from the gearbox 75, the shaft 81 has other external axial splines 83, by which the shaft 81 engages with corresponding internal axial splines 84 of a drive sleeve 85, bearing axially by its internal (that is to say pointing toward the gearbox 75) axial end, against an external radial shoulder 86 of the shaft 81. This sleeve 85, thus linked in rotation to the shaft 81, is coaxial with the latter by virtue especially of an internal cylindrical bearing surface 87, at which this sleeve 85 has an external radial annular flange 88, by which the sleeve 85 is fixed to a hub described hereinbelow, and to which the sleeve 85 transmits the drive torque received from the shaft 81, which receives it from the bevel gear.

As in the aforementioned Patent U.S. Pat. No. 4,626,172, the hub has substantially the shape of a circular cake mold provided with a central chimney. This hub comprises a metal hub body 89, for example made of deep-drawn sheet, or made of composite materials, for example from an injected synthetic material which is reinforced with fibers, having the shape of a bowl whose base consists of an annular part, in external radial position, which is slightly frustoconical 90, and connected by an intermediate part 91, also frustoconical, and pointing toward the inside of the bowl, to a planar annular internal radial plate 92 surrounding a central opening of diameter greater than the external diameter of the shaft 81, so that the body 89 can be slid axially about this shaft 81, until it comes to rest by the plate 92 against the flange 88 of the sleeve 85. The body 89 also comprises two mutually coaxial cylindrical walls, one of which, 93, in the external radial position and connecting via its internal axial end to the external radial end of the part 90 of the base, has a height greater than that of the other cylindrical wall 94, in the radial internal position and connecting by its internal axial end to the intermediate part 91 of the base. In these two walls 93 and 94 are pierced, for each of the blades of the rotor, two coaxial circular openings 95 and 96, centered on a radial axis, and such that the opening 95 in the external wall 93 has a diameter greater than the diameter of the opening 96 in the internal wall 94. Two self-lubricating rings 97 and 98 are mounted respectively in the openings 95 and 96, and held in the latter, the edges of which they overlap, the internal diameter of the ring 97 being greater than that of the ring 98.

The rotor also includes eight blades, which are each identical to the blade 1 in FIG. 1. By way of example, in a tunnel 72 which is approximately 850 mm in diameter, the rotor 71, driven at a speed of rotation of the order of 4,500 rpm, from the shaft 77 having a speed of rotation of the order of 6,000 rpm, is equipped with eight blades, each of which has a length of the order of 400 mm, from the tip of the blade, at its external radial end, to the free end of the laminate attachment 14, at its internal radial end, each blade having a chord of the order of 60 to 66 millimeters.

With respect to the blade 1 represented in FIG. 1, the structure of each blade of the rotor 71 is supplemented by a pitch control sleeve 20, mounted about Its blade root 3. This sleeve 20, made of metal or composite material, essentially comprises two tubular parts 21 and 22 which are coaxial, and of circular section having different internal and external diameters, and connected by a central frustoconical part 23. The tubular part 21, in the external (with respect to the axis A of rotation of the rotor 71) radial position and of larger diameter, covers the blade root 3 and is fixed to the latter, for example by bonding, in order to solidly attach the sleeve 20 to the blade root 3. Around its external radial end, this part 21 of the sleeve 20 has a collar 21a mounted journalled in the ring 97. Similarly, about its internal radial end, the part 22 of smaller diameter and in internal radial position on the sleeve 20 has a collar 22a mounted journalled in the ring 98. This part 22 of the sleeve 20 also includes a side crankpin 22b, projecting toward the outside of the sleeve 20, in a direction substantially perpendicular both to the axis of the sleeve 20 and to the axis A of rotation of the rotor 71.

The dimensions and the volume of the sleeve 20 and of its side crankpin 22b are such that, by suitably inclining a blade and its sleeve 20, after having inserted the internal radial end of its rooting part 4 and the corresponding laminate attachment 14 as well as the part 22 of the sleeve 20 into an opening 95 in the external wall 93 of the hub, it is possible to pass the side crankpin 22b into this opening 95, then to engage the part 22 of the sleeve 20 in the corresponding opening 96 and to position the sleeve 20 such that its end collars 21a and 22a respectively come to bear journalled inside the rings 97 and 98 of the openings 95 and 96.

When the blade is in this position, the laminate attachment 14 at the internal radial end of its rooting part 4 is received between the plate 92 of the hub 89 and an external metal plate 99, in external axial position with respect to this plate 92, it being possible for this plate 99 to be produced in the form of an annular disk surrounding, with radial clearance, the drive shaft 81.

The blade is then Joined to the body 89 by the laminate attachment 14 of its rooting part 4, in the manner already described hereinabove with reference to FIGS. 11 to 13 and 15 to 18. The plate 99 is attached to the body 89, at the same time as the latter is fixed to the flange 88 of the sleeve 85, by pairs of bolts 100 applied by their head 100a against the internal axial face of the flange 88 of the sleeve 85, and by nuts 101, each screwed onto the threaded end 100b of the shank of a bolt 100 which projects on the external axial face of the plate 99, the shanks of the bolts 100 passing axially through aligned holes in the flange 88, of the plate 92 of the body 89, and of the plate 99. In this way, the latter and the plate 92 constitute a radial grip which is open toward the outside, and in which the laminate attachment 14 is clamped. By the concave side faces, such as 15 and 18 in FIG. 1, of the laminate elements 14a, 14b, 14c, 17a and 17b of the laminate attachment 14, the latter bears radially toward the outside against the side faces of the shanks of two bolts 100, located laterally on either side of the two end linkage portions 13a and 13b of the two torsion strips 12a and 12b of the rooting part 4 of the blade. These bolts 100 thus constitute removable pins for holding the blade on the body 89, removal of these pins making it possible independently to unfit the blade in question and remount it on the hub.

An annular flange disk 102 has its central opening provided with a female screw thread by which this flange disk is screwed onto a corresponding male screw thread 103 made on the end of the shaft 81, so that this flange disk 102 is axially joined to the shaft 81. This flange disk 102 is pierced with tapped axial bores into which fixing screws 104 are screwed, the end of whose shank, in the form of a bearing stud 104a, is engaged in a recess in the external axial face of the plate or disk 99, and applied against a bearing surface of the base of this recess. This assembly improves the clamping of the laminate attachments 14 between the plates 92 and 99. In fact, the screws 104 then constitute pressure screws, the shanks of which bear against the disk 99 to press it toward the plate 92 of the body 89 and against the laminate attachments 14 of the blades, in order to complete their clamping between the disk 99 and the plate 92, and in order to ensure good axial fixing of the stack of the disk 99, of the laminate attachments 14, of the body 89 and of the sleeve 85.

Furthermore, when each blade is suitably arranged in the hub 89, so that the collars 21a and 22a of the corresponding sleeve 20 bear inside the rings 97 and 98 of the corresponding openings 95 and 96, the crankpin 22b of the sleeve 20 faces one of several axial lugs 105, the number of which is equal to the number of blades of the rotor, and the external axial end of which is solidly attached to an annular, bulged pitch control plate 106. By a ring arrangement of screw-nut assemblies, not shown, the internal radial edge of the control plate 106 is superposed and solidly attached to the external radial edge of a flange disk 107 of frustoconical shape, in order to have good rigidity, and which is mounted by conical fitting of its central part over a conical journal 108 of a spindle or shaft 109 for collective pitch control, which is mounted axially sliding in a drive shaft 81 of the rotor 71, the flange disk 107 being held on the shaft 109 by a nut 110 and a check nut 111 which are screwed onto the threaded external axial end 108a of the journal 108.

Each of the axial lugs 105 of the plate 106 is pierced with a bore equipped with a ring in which the pivot 112 of a universal joint 113 connecting the crankpin 22b of the blade sleeve 20 to the corresponding lug 105 is housed. This universal joint 113 may, for example, comprise a stud pin, the threaded end of whose shank passes through a hole in the crankpin 22b and receives a nut pinned onto this shank in the screwed position, while the pivot is held by a transverse pin on the shank and against the head of the stud pin.

In combination with the corresponding crankpin 22b and universal joint 113, each lug 105 thus constitutes a control lever for the pitch of the corresponding blade, the blade root 3 of which is solidly attached to the corresponding sleeve 20. The various levers thus constituted, the plate 106, the flange disk 107 and the shaft 109 constitute an assembly for collective control of the pitch of the blades of the rotor 71, such that any axial displacement of the shaft 109 in the shaft 81 controls, via the levers 105 and their universal joints 113 to the crankpins 22b, the application of a twisting torque on the sleeves 20, and therefore also on the blade roots 3 of all the blades, about the longitudinal axes of the latter. This twisting torque causes rotation of the sleeves 20, and therefore also of the blades, about the longitudinal axes of the latter, while leading to twisting of the sheet torsion bars 12a and 12b of the rooting part 4 of each blade. Each lever 105 is situated between the two collars 21a and 22a of the corresponding sleeve 20, which collars are at maximum separation from each other, which makes it possible to ensure better bearing of each blade and to reduce the radial forces exerted by the collars 21a and 21b on the corresponding rings 97 and 98.

In order to reduce the noise caused by the rotation of the rotor 71 in its fairing 74 to a level which is not greater than that obtained with a rotor equipped with an odd number of blades, as is the case in the aforementioned Patent U.S. Pat. No. 4,626,172, the even number of blades of the rotor 71 are not regularly distributed circumferentially about the axis of rotation A of the rotor 71, but are instead arranged substantially concentrically around the axis A with a specified azimuthal modulation, represented in FIG. 21.

The blades, of which there are an even number, are grouped in pairs of blades which are substantially diametrically opposite with respect to the axis A, the longitudinal axes of all the blades, which are the longitudinal axes of their rooting parts 4, being substantially convergent on the axis A.

But, in this example, the eight blades of the rotor 71 are such that the two blades 1A of one pair of diametrically opposite blades each have, with respect to each of the two blades 1B which are adjacent to it among the other three pairs of blades 1B, an angular offset which is different from that which the two adjacent blades 1B among the three other pairs of blades 1B have.

This different angular offset corresponds to an angle a1, formed between the longitudinal and radial axis of a blade 1A and the longitudinal and radial axis of an adjacent blade 1B, which is greater than the angle a2 formed between the longitudinal and radial axes of two adjacent blades 1B.

In the rotor example in FIGS. 20 and 21, a1 is of the order of 58° and a2 is of the order of 32°.

This different angular offset is produced by interposing a wedge 114, of generally triangular shape, between the laminate attachment 14 of each blade 1A and the laminate attachment 14 of each of the two blades 1B which are adjacent to it, respectively on either side of the laminate attachment 14 of the blade 1A in question, in an arrangement in which the laminate attachments 14 of the six blades 1B, distributed in two groups, which are diametrically opposite with respect to the axis A, of three adjacent blades 1B, are side-by-side and bearing by their facing convergent side faces 16 and 19 (see FIG. 1) in an arrangement already described hereinabove with reference to FIG. 13.

Each wedge 114 has a laminate structure and consists of a stack of layers of fibers which are agglomerated by a rigidified synthetic resin. Preferably, the same resin, the same fabrics of the same fibers, the same orientations of the warp and weft yarns with respect to the direction which is radial to the axis A, will be used as for producing the laminate elements of the laminate attachments 14. Furthermore, each wedge 114 has, parallel to the axis A, the same thickness as the laminate attachments 14 and, perpendicular to this direction, substantially the same shape of the various stacked layers, that is to say a substantially trapezoidal shape, with opposite side faces which converge toward the axis A and are contained in planes which intersect on the axis A, and concave recesses, with concavity pointing sideways and radially outward, and substantially in the shape of a quarter of the side surface of a cylinder, at the location of the vertices adjacent to the long base, in the external radial position, of the trapezoidal shape of the layers of fibers, and facing concave recesses of substantially the same shape, defined on the laminate attachments 14 by the concave surfaces such as 15 and 18 in FIG. 1, of their laminate elements 14a, 14b, 14c, 17a and 17b.

Each wedge 114 therefore constitutes a laminate false attachment, insofar as it is distinguishable from a laminate attachment 14 essentially only in that no end portion of a torsion bar is interposed in the stack of the layers of fibers which constitute it.

Consequently, the laminate attachments 14 of the blades 1A and 1B, as well as the laminate wedges or false attachments 114 are arranged side-by-side and bonded laterally to each other by their side faces 16-19 which converge toward the axis A, so as to form a segmented disk around the axis A, and two neighboring laminate attachments 14 or one laminate attachment 14 and one laminate false attachment or wedge 114 which are next to each other are in radial abutment toward the outside against the cylindrical side face of one and the same bolt or pin 100 for holding on the hub 89, by the concave recessed parts of the facing side faces by which these two neighboring laminate attachments 14 or this laminate attachment 14 and this laminate false attachment or wedge 114, which are next to each other, are bonded together. Thus, each laminate false attachment 114, like each laminate attachment 14, is held radially toward the outside by bearing against two pins 100.

As a variant, when the angle a1 of the particular angular offset of the blades 1A is much greater than the angle a2 between the longitudinal axes of the other blades 1B, several wedges or laminate false attachments 114 may be arranged side-by-side between two laminate attachments 14, in the segmented disk constituted by all the laminate attachments 14 and laminate false attachments 114.

In another variant, and as a function of the even number of blades, the rotor may include several pairs of diametrically opposite blades having angular offsets different from that of the other blades, and optionally also different from each other.

Finally, as represented in FIG. 20, a bulged cover 115 may be fixed by its external radial edge to the inside of the periphery of the external radial wall 93 of the hub body 89, for example by elastic clip-fastening, in small recesses of the internal face of this wall 93, of bulged elastic tongues 116 bolted at 117 onto the cover 115, in order to cover the collective pitch control assembly of the blades and to protect the hub against penetration of dust, stones and other dirt.

This embodiment of the variable-pitch multiblade rotor allows easy mounting and removal of its various components, which considerably facilitates the servicing operations and decreases the cost of its maintenance. In particular, it is easy to change a damaged blade, without having to remove a large number of elements. For this purpose, the flange disk 107 may be open-worked, in order to allow access to the nuts 101 as well as to the screws 104, without having to remove the flange disk 107 and the plate 106 of the pitch control shaft 109.

The blades may be manufactured essentially from composite materials with thermosetting matrices, as in the aforementioned patents, or thermoplastic matrices, with aramid, glass or carbon reinforcing fibers, and in particular from the polyetheretherketone resin termed "PEEK" reinforced with carbon fibers.

It is claimed:

1. A blade-hub linkage device for fastening at least one blade to a rotor hub of a multiblade rotor, said blade comprising:
   a rigid shell with aerodynamic profile, having a tubular blade root on the side attached to the hub,
   a strengthened framework, which is at least partially housed substantially longitudinally in the shell, and
   an blade rooting part, comprising at least one elongated torsion bar for attachment of the blade, said torsion bar being twistable about its longitudinal axis, made from composite material and comprised of substantially unidirectional fibers agglomerated by a rigidified synthetic resin, said torsion bar being linked to the said framework and extending at least partially outside the shell and passing through the blade root, said blade-hub linkage device comprising for at least said torsion bar, a laminate attachment including at least two laminate elements between which a bar end portion for linking said bar to the hub is sandwiched and fixed, said end portion being substantially flattened, each laminate element comprising a stack of at least two layers of fibers which are agglomerated by a rigidified synthetic resin, at least one of the resins of the torsion bar and of the laminate attachment solidly joining said laminate elements to said end portion, the solid combination of said laminate attachment and the end portion of said bar being in abutment against means for holding the laminate attachment and the blade to the hub.

2. The linkage device as claimed in claim 1 wherein the blade rooting part comprises at least two of said torsion bars of which at least the substantially flattened end portions are spaced apart in a direction substantially perpendicular to said end portions, wherein the laminate attachment comprises at least one additional and intermediate laminate element arranged between the end portions of said two bars, said intermediate laminate element having a laminate structure similar to that of the other laminate elements, and being solidly attached to said two bars by agglomeration by at least one rigidified synthetic resin.

3. The linkage device as claimed in claim 1, wherein the laminate attachment also comprises at least one laminate side filling element, with a laminate structure similar to that of the other laminate elements, and arranged between said two laminate elements of said attachment and against one side face of the bar end portion which is sandwiched and fixed between said two laminate elements, said laminate side filling element being solidly attached to said two laminate elements and to said bar end portion by at least one rigidified synthetic resin.

4. The linkage device as claimed in claim 1, wherein said means for holding the laminate attachment and the blade to the hub comprise two detachable pins arranged on either side of said at least one torsion bar, at the end portion of said torsion bar for linkage to the laminate attachment, the shape of said laminate attachment being such that it bears against said two pins.

5. The linkage device as claimed in claim 1, wherein said holding means includes means forming at least one grip linked in rotation to the hub.

6. The linkage device as claimed in claim 1, wherein the laminate attachment has an end part which narrows so as to allow bonding of at least two laminate attachments linked to two adjacent blades.

7. The linkage device as claimed in claim 6, wherein said at least two laminate attachments linked to a corresponding number of adjacent blades are combined in an attachment in the shape of at least one annular disk portion.

8. A blade-hub linkage device incorporating a blade to be fastened to a rotor hub, said blade comprising:
   a rigid shell, with aerodynamic profile, elongated longitudinally along the span of the blade, and having a tubular blade root on the side attached to the hub,
   a strengthened framework which is at least partially housed substantially longitudinally in the shell, and
   a blade rooting part, comprising at least one elongated torsion bar for attachment of the blade, said torsion bar being twistable about its longitudinal axis, made from composite material and comprised of substantially unidirectional fibers agglomerated by a rigidified synthetic resin, said torsion bar being linked to said framework and extending at least partially outside the shell and passing through the blade root, said blade-hub linkage device comprising, for said at least one torsion bar of the rooting part, a laminate attachment including at least two laminate elements between which a bar end portion for linking said torsion bar to the hub is sandwiched and fixed, said end portion being situated along the longitudinal axis of the shell and being substantially flattened, each laminate element comprising a stack of at least two layers of fibers which are agglomerated by a rigidified synthetic resin, at least one of the resins of the bar and of the laminate attachment solidly joining said laminate elements to said end portion, the solid combination of said laminate attachment and the end portion of said bar being in abutment against means for holding the laminate attachment and the blade to the hub.

9. The blade-hub linkage device as claimed in claim 8 wherein said at least one torsion bar of the rooting part of the blade is integral with a composite longitudinal bar of similar composition, included in at least one spar of the strengthened framework of the blade.

10. The blade-hub linkage device as claimed in claim 9 wherein the rooting part of the blade comprises at least two said torsion bars which separate from each other in the direction of said end portion starting from a portion for joining to the spar, inside the tubular root of the blade.

11. The blade-hub linkage device as claimed in claim 8 wherein said at least one torsion bar of the rooting part of the blade is fitted, at the end opposite said laminate attachment, with removable means for linking to the strengthened framework of the blade.

12. The blade-hub linkage device as claimed in claim 11, wherein said torsion bar is solidly attached, at the end opposite said laminate attachment to a second laminate attachment said second laminate attachment being held, in the tubular blade root, by the removable holding means on the strengthened framework of the blade, said second laminate attachment being in abutment against said holding means.

13. The blade-hub linkage device as claimed in claim 12, wherein the rooting part of the blade comprises two said torsion bars arranged in two strips which are substantially parallel to each other but spaced apart, of which the ends for linkage to the framework of the blade are solidly attached to said second laminate attachment.

14. A multiblade rotor comprising:
   a drive shaft for being driven in rotation about an axis of rotation of the rotor,
   a hub linked in rotation with the drive shaft,
   a plurality of blades, each of which is joined to the hub by a rooting part with at least one composite, elongate torsion bar, wherein each blade comprises
   a rigid shell, with aerodynamic profile, elongated longitudinally along the span of the blade, and having a tubular blade root on the side attached to the hub, and
   a strengthened framework, which is at least partially housed substantially longitudinally in the shell, said at least one torsion bar being twistable about its longitudinal axis, made from composite material and comprised of substantially unidirectional fibers agglomerated by a rigidified synthetic resin, said at least one torsion bar being linked to said framework and extending at least partially outside the shell and passing through the blade root, the rooting part of each said blade being joined to the hub by a blade-hub linkage device which comprises for said at least one bar of the rooting part, a laminate attachment including at least two laminate elements between which a bar end portion for linking said bar to the hub is sandwiched and fixed, said end portion being substantially flattened, each laminate element comprising a stack of at least two layers of fibers which are agglomerated by a rigidified synthetic resin, at least one of the resins of the bar and of the laminate attachment solidly joining said laminate elements to said end portion, the solid combination of said laminate attachment and the end portion of said bar being in abutment against means for holding the laminate attachment and the blade to the hub.

15. The rotor as claimed in claim 14, which comprises an even number of blades grouped in pairs of two diametrically opposite blades, wherein each blade of at least one pair of blades has, with respect to two blades which are adjacent to it, an angular offset which is different from the angular offset of adjacent blades of other pairs of blades.

16. The rotor as claimed in claim 15, wherein said different angular offset is obtained by inserting at least one wedge comprised of at least one stack of fibers which are agglomerated by a rigidified synthetic resin, on either side of said laminate attachment of each said blade of said at least one pair of blades.

17. The rotor as claimed in claim 16, wherein the laminate attachments of said blades and the wedges are laterally bonded to each other by faces which converge toward the axis of rotation of the rotor.

18. The rotor as claimed in claim 14, wherein the means for holding the laminate attachments and the blades to the hub are removable pins of screw-nut assemblies linking the hub to the drive shaft, and wherein the hub comprises:

a) a hub body, in the form of an annular plate surrounding the drive shaft with radial clearance,
b) a drive sleeve, surrounding the drive shaft with which it is linked in rotation by splines and having a radial flange for bearing against the annular plate, and
c) a second plate, in the shape of an annular disk surrounding the drive shaft with radial clearance, which is held to the hub plate by said screw-nut assemblies further fixing the hub plate to the flange of the sleeve, while holding on said hub plate the laminate attachments which are clamped side-by-side between said hub plate and second plate, and
d) a flange disk, screwed onto the end of the drive shaft, with which it is thus axially linked, and pierced with tapped orifices into which pressure screws having shanks are screwed, said shanks bearing against said second plate, in order to press it toward the hub plate and against the laminate attachments in order to complete their clamping between said plates and to ensure good axial offset of said second plate, of the laminate attachments and of the drive sleeve.

* * * * *